(12) United States Patent
Harmon

(10) Patent No.: US 6,707,278 B2
(45) Date of Patent: Mar. 16, 2004

(54) TRANSITION VOLTAGE START REGULATOR

(75) Inventor: Jack Douglas Harmon, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 102 days.

(21) Appl. No.: 10/127,183

(22) Filed: Apr. 22, 2002

(65) Prior Publication Data

US 2003/0197491 A1 Oct. 23, 2003

(51) Int. Cl.$^7$ ................................................ H02P 9/00
(52) U.S. Cl. ........................................... 322/37; 322/28
(58) Field of Search ............................ 322/28, 36, 37, 322/99; 290/7, 8

(56) References Cited

U.S. PATENT DOCUMENTS

| | | | |
|---|---|---|---|
| 2,976,473 A | 3/1961 | Shaw et al. ................... 322/28 |
| 4,275,344 A | 6/1981 | Mori et al. .................... 322/28 |
| 4,636,705 A | * 1/1987 | Bowman ....................... 322/28 |
| 4,636,706 A | 1/1987 | Bowman et al. ............... 322/28 |
| 5,254,936 A | 10/1993 | Leaf et al. ..................... 322/90 |
| 5,280,232 A | * 1/1994 | Kohl et al. .................... 322/23 |
| 6,215,285 B1 | 4/2001 | Harmon ........................ 322/29 |
| 6,225,790 B1 | * 5/2001 | Harmon ........................ 322/28 |
| 6,429,627 B1 | * 8/2002 | Koss et al. .................... 322/27 |
| 6,534,959 B1 | * 3/2003 | Anderson et al. ............. 322/28 |
| 2002/0043962 A1 | * 4/2002 | Taniguchi et al. ............. 322/28 |
| 2003/0042874 A1 | * 3/2003 | Anderson et al. ............. 322/28 |

* cited by examiner

*Primary Examiner*—Nicholas Ponomarenko
(74) *Attorney, Agent, or Firm*—Jimmy L. Funke

(57) ABSTRACT

A system for battery-based activation of a voltage regulator has a voltage detection circuit that measures the voltage produced by a battery, for example, an automotive system battery. The system further includes a voltage regulation unit, which is activated when the voltage that the battery produces is below a threshold value indicative of an attempt to start an engine. To begin regulation, a field current signal of a generator is strobed to create a battery voltage signal that exceeds the minimum reference value. If the battery voltage signal is above a minimum reference value, the battery voltage signal will be analyzed to ensure that neither voltage spiking nor a no load change condition caused the anomaly. Once these safety checks are complete, the battery voltage signal can be regulated.

12 Claims, 3 Drawing Sheets

TRANSITION VOLTAGE START REGULATOR

BACKGROUND OF THE INVENTION

1. Technical Field

The present invention relates to a method and system for battery-based activation of a voltage regulator. The present invention more particularly relates to a voltage regulation method and system that is activated based on a battery voltage signal.

2. Description of the Related Art

Voltage regulation systems for controlling the field current of a diode-rectified alternating current generator, which supplies the electrical loads on a motor vehicle, generally are well known to those skilled in the art. One known type of voltage regulator senses the voltage applied to the battery, and if this voltage is higher than a desired regulated value, a transistor that controls field current is switched off. When generator voltage drops below the regulated value, the field controlling transistor is switched on. The transistor is repetitively switched on and off in response to sensed voltage changes to thereby cause the output voltage of the generator to be maintained at a predetermined, desired regulated value.

In another type of known voltage regulator, the field current is pulse-width modulated at a constant frequency to maintain the output voltage of the generator at a desired regulated value. In this type of regulator, the pulse width is a function of the difference between actual generator output voltage and a desired voltage. Examples of this type of regulator are disclosed in U.S. Pat. No. 2,976,473 to Shaw et al. and U.S. Pat. No. 4,275,344 to Mori et al. British Patent No. 1,392,096 also discloses pulse-width control of field current, and in that patent, the voltage reference takes the form of a cyclic staircase waveform.

Another example of a voltage regulator that employs pulse-width modulation of generator field current is disclosed in U.S. Pat. No. 4,636,706 to Bowman et al., the contents of which are incorporated herein by reference. According to Bowman et al., the regulator disclosed in that patent utilizes a digital apparatus that includes an up-down counter which responds to the relative magnitudes of the actual output voltage of the generator and the desired regulated output voltage of the generator. When the actual output voltage of the generator is below the desired regulated value, the counter is incremented or counted up, and when the actual output voltage is above the desired regulated value, the counter is decremented or counted down. The instantaneous count in the counter is used to determine the on time of a semiconductor switch that is connected in series with the field winding of the generator. The instantaneous count thus determines the pulse-width of the voltage that is applied to the field. Whenever actual output voltage exceeds the desired regulated value, the field controlling semiconductor switch is biased off. Thus, during the time that the actual output voltage is above the desired regulated value, the field is not energized and the counter is decremented. When actual output voltage then drops below the desired regulated value, the field is energized at the pulse-width represented by the magnitude of the count in the counter, and the counter is incremented.

Regardless of which type of voltage regulator is implemented, it is desirable to turn off the voltage regulator associated with an engine whenever the engine is not running. This prevents the energy stored in the engine's battery from being drained by the regulator's circuitry.

The voltage regulator, however, must be reactivated when the engine is started (i.e., when the generator begins to turn). One conventional way of reactivating the voltage regulator is to wire a vehicle's ignition switch or other circuitry associated therewith to an activation input terminal (i.e., the lamp input) of the voltage regulator. In particular, this wiring is performed so that the voltage regulator gets "strobed on" by closure of the ignition switch. This wiring arrangement, while generally effective, does require an electrical connection from the ignition switch or its associated circuitry to the voltage regulator. However, this added connection has some disadvantages. Since the connection extends out from where the regulator and/or generator is mounted, the connection remains relatively unprotected and susceptible to damage. The connection can be inadvertently disconnected, cut or otherwise rendered inoperative. The soldering techniques that are typically used to effect the added connection also can fail. If any of these events occur, the voltage regulator typically cannot become activated. As a result, no voltage regulation is provided and/or the generator fails to generate current. In the automotive context, this translates into added costs associated with repair and/or warranty work.

Consequently, there is a need in the art for a method and/or system capable of activating a voltage regulator in such a way that no external connection to an ignition switch is required, thereby reducing the likelihood that the voltage regulator will fail to become activated in response to the starting of the engine.

Another conventional technique for activating a voltage regulator avoids the external connection to the ignition switch by using the residual magnetism in the vehicle's generator. In particular, one or more of the phases from the generator is connected to the lamp input (or another suitable input) of the voltage regulator and the residual magnetism from the associated winding is used to activate the voltage regulator when the generator begins to turn. The residual magnetism, however, can dissipate over time (e.g., through diode leakage in the bridge rectifier of the generator). This dissipation can result in turn-on problems for the generator. Similar problems arise when road salt or other contaminants invade the bridge rectifier of the generator. The residual magnetism-based arrangement therefore tends to be unreliable in some respects. In addition, disassembly of the generator and re-assembly requires the voltage regulator to be "flashed," since there is no residual magnetism left in the windings after re-assembly of the generator. Such an arrangement also requires "flashing" when it is initially assembled.

Consequently, there is a need in the art for a method and/or system adapted to minimize or eliminate one or more of the shortcomings set forth above. In particular, there is a need in the art for a method and/or system adapted to activate a voltage regulator without requiring a connection to an engine's ignition switch or related components, and also without requiring the presence of residual magnetism in the windings of the generator during an engine start.

SUMMARY OF THE INVENTION

One object of the present invention is to overcome one or more of the foregoing and other problems.

One advantage of the present invention is that unlike in conventional systems, it requires no additional connections external to the regulator. Another advantage is that no additional electrical inputs are required for regulator activation. The present invention provides a method adapted to activate a voltage regulator in response to a battery signal.

This method begins by taking a measurement of the voltage signal provided by the battery. When the value of the battery voltage signal is below a threshold reference value indicative of when an engine is being started, then an activation signal is generated. The activation signal is applied to a voltage regulator to thereby commence regulation.

In a preferred embodiment, a field current through a field winding of a generator is strobed. Once strobing has begun, if the engine is rotating (and hence also the generator), the generator will produce an output (due to the active field current) and regulation begins.

A system for battery-based activation of a voltage regulator is also presented.

BRIEF DESCRIPTION OF THE DRAWINGS

The present invention will now be described by way of example, with reference to the accompanying drawings, in which.

DETAILED DESCRIPTION OF THE PREFERRED EMBODIMENTS

Figure 1:
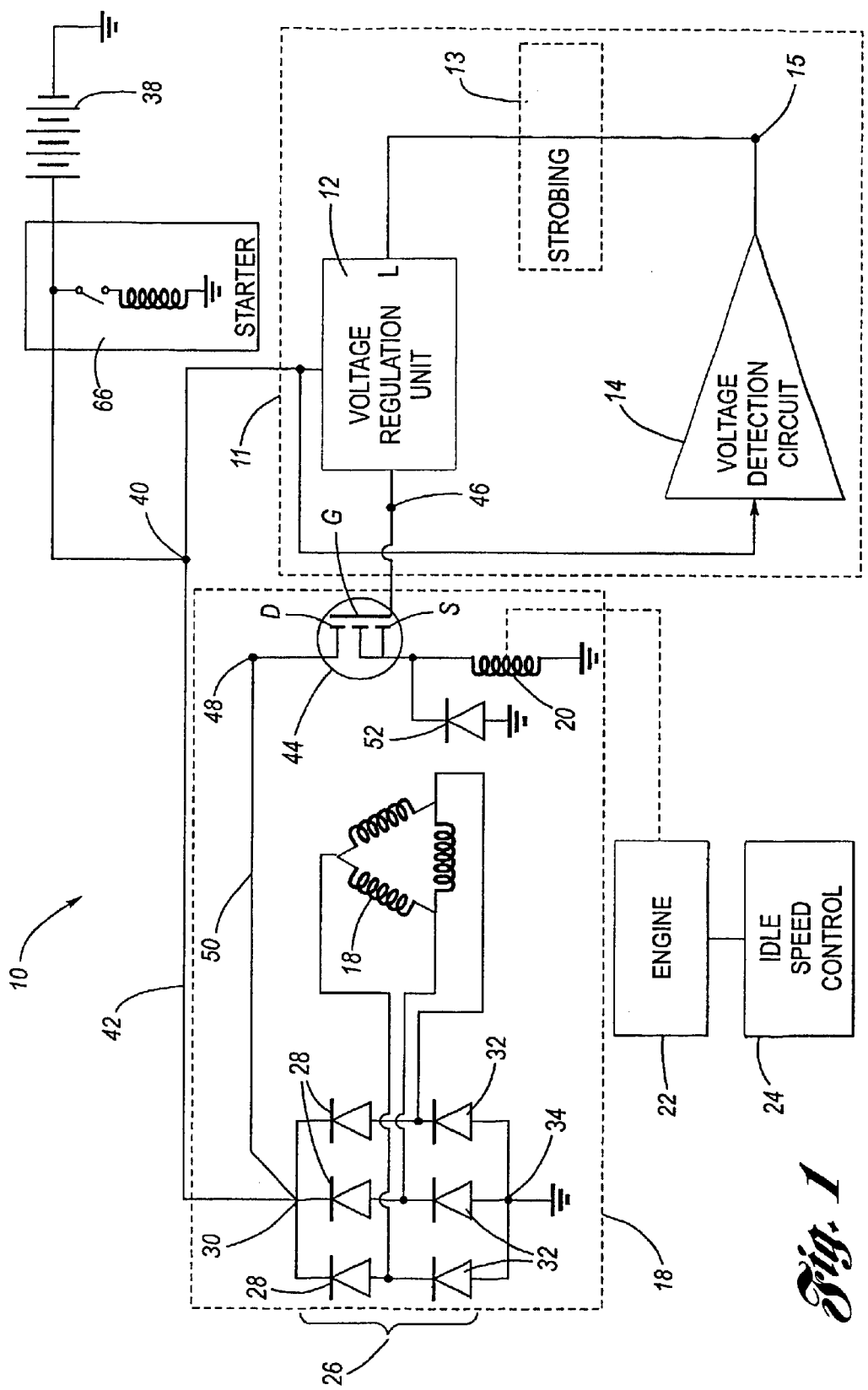
FIG. 1 illustrates a motor vehicle charging system in accordance with the present invention.

FIG. 1 illustrates a motor vehicle electrical charging system 10 according to of the present invention. Charging system 10 includes a voltage regulator 11 having a (i) voltage regulation unit 12 and (ii) a battery voltage detection circuit 14 that is adapted to activate voltage regulation unit 12 in a manner to be described hereinafter. Voltage detection circuit 14 generates an activation signal, designated $S_{15}$, on node 15. The signal $S_{15}$ is applied to a "LAMP" input of regulation unit 14, designated a "L" in FIG. 1. Charging system 10 also has an alternating current (AC) generator 16. Generator 16 may be a multiphase AC generator of a conventional type, and is shown, for example purposes only, having a three-phase delta-connected stator winding 18 and a rotatable field winding 20. Generator 16 may be of the type disclosed in the U.S. Pat. No. 3,538,362 to Cheetham et al. with the exception that the generator in FIG. 1 has a delta-connected stator winding rather than the Y-connected stator winding shown the Cheetham et al. patent. It will be understood, however, that voltage regulation unit 12 and voltage detection circuit 14 of this invention can be used with generators that have either delta or Y-connected stator windings or various combinations thereof, having more or less than three phases (although 3-phase is common).

Field winding 20 is part of a rotor assembly (not shown) that is rotatably driven by an engine 22, which may be included, for example, in a motor vehicle (also not shown). Engine 22 is shown connected to an idle speed control 24 which controls the idle speed of engine 22. Generator 16 typically is driven at a higher speed than the speed of engine 22 by a belt and a pulley arrangement in a well known manner.

In the illustrated embodiment, the output terminals of stator winding 18 are connected to respective AC input terminals of a three-phase full-wave bridge rectifier, designated by reference numeral 26. As also illustrated, bridge rectifier 26 may include three positive diodes 28 which have their cathodes connected to a direct current (DC) voltage output terminal 30. As further illustrated, bridge rectifier 26 may also have three negative diodes 32, the anodes of which are connected to a grounded direct current (DC) output terminal 34 of bridge rectifier 26. A voltage that is developed at junction 36 is a pulsating voltage (AC), and the frequency of the voltage pulses developed at junction 36 is a function of generator and engine speed. When the generator 16 is not rotating, it does not generate an output voltage and the voltage at junction 36 is substantially zero.

Connected to charging system 10 is a storage battery 38. The negative side of battery 38 is grounded and the positive side of battery 38 is connected to a junction 40. Battery 38 will be assumed to be a 12-volt storage battery in the description of this invention, though it is understood that the invention is not limited in this regard. Battery 38 is charged by a circuit that includes a conductor 42 that connects DC voltage output terminal 30 of bridge rectifier 26 to junction 40. Battery 38 and generator 16 feed various electrical loads, not illustrated, on the motor vehicle, that are electrically connected between junction 40 and ground.

Voltage regulation unit 12 controls an electrical current through field winding 20 to regulate the voltage appearing between junction 40 and ground to a desired regulated value. As mentioned above, in describing this invention, it will be assumed that the system is a 12-volt system and that the desired regulated voltage that is to be maintained between junction 40 and ground is about 14 volts (e.g., 13.6 volts). This desired regulated voltage typically will vary with temperature. Though the foregoing exemplary voltages are used in the description, it is understood that the invention may be practiced using different voltages. For example, 42-volt systems will fall within the spirit and scope of the present invention, with corresponding reference values being selected for such system. Voltage regulation unit 12 may comprise conventional apparatus known in the art, having an activation input terminal (e.g., as in Bowman et al. described above).

The current through field winding 20 may be controlled by a switch, such as a semiconductor switching device, which may take the form of a metal oxide semiconductor (MOS) field effect transistor 44, although other switching devices may obviously be used. In the illustrated embodiment, transistor 44 may be N-channel enhancement mode type of transistor. Transistor 44 is shown having a gate terminal "G" connected to conductor 46, a drain terminal "D" connected to junction 48 and a source terminal "S" connected to a first side of field winding 20. A second side opposite the first side of field winding 20 is connected to ground. Junction 48 is connected to positive DC terminal 30 of bridge rectifier 26 via a conductor 50. It should be understood that in some embodiments, switch 44 is included in regulator 11 (this arrangement is not specifically shown). A field winding discharge diode 52 is connected across field winding 20.

When transistor 44 is biased into a conductive state (i.e., conductive between its drain D and source S), current will flow through field winding 20 originating from positive direct voltage output terminal 30, through conductor 50 to junction 48, through the drain D and source S electrodes of transistor 44 and then through field winding 20 to ground. Transistor 44 is switched on and off, in a manner known in the art, in order to maintain the voltage at junction 40 at the desired regulated value, which for exemplary purposes has been assumed to be about 14 volts (e.g., 13.6 volts). Of course, nodes 30 and 40 are electrically connected and will assume substantially the same voltage.

Since voltage regulation unit 12 consumes some energy, it may conventionally be turned-off when engine 22 is turned off. This prevents battery 38 from being drained by voltage regulation unit 12, especially if engine 22 remains off for a long period of time. As long as engine 22 remains off, voltage regulation unit 12 remains off. When engine 22 is to be restarted, there is consequently a need to activate voltage regulation unit 12. Prior art arrangements may use a connection from one or more of stator windings 18 to activate voltage regulation unit 12 using residual magnetism in the stator windings 12, or use a connection from the ignition switch of the vehicle (or associated circuitry such as a lamp circuit) to activate voltage regulation unit 12. As indicated above, however, such arrangements suffer from certain disadvantages. Charging system 10 avoids those disadvantages by providing a voltage regulator 11 having a battery voltage detection circuit 14.

Battery voltage (e.g., B+) is always available to the regulator. When the battery voltage is used for activation, then no additional connections will be required. As will be described in greater detail hereinafter, voltage detection circuit 14 processes the battery voltage (i.e., the level thereof in one embodiment) to activate the regulator to begin regulation, and thus requires no additional external electrical connections. Voltage detection circuit 14 is preferably integrated with voltage regulation unit 12 to make regulator 11. Regulator 11 may be, and preferably is, colocated with the generator 16. An integrated unit may be preferred since it makes protection of the electrical connection between voltage regulation unit 12 and voltage detection circuit 14 more economical and minimizes the likelihood of failure of a connection and any repair or warranty costs associated therewith. Voltage detection circuit 14 alternatively can be implemented as a separate unit from voltage regulation unit 12 and/or generator 16, if such a design is deemed acceptable or more desirable.

Figure 2A:
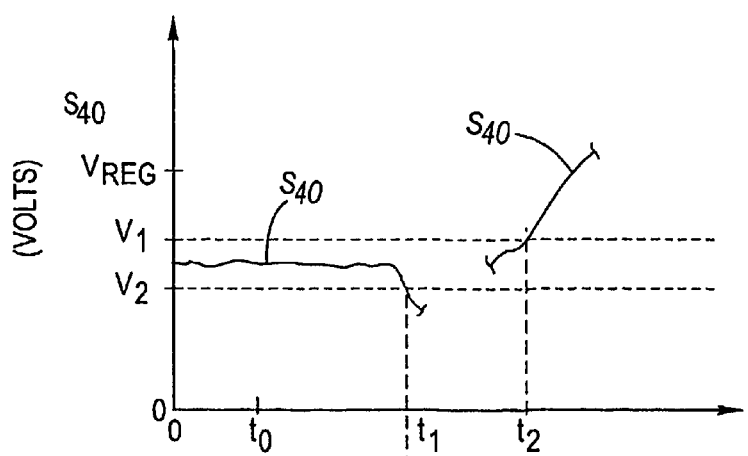
FIGS. 2A–2B are timing diagrams showing generation of an activation signal according to the invention.
Figure 2B:
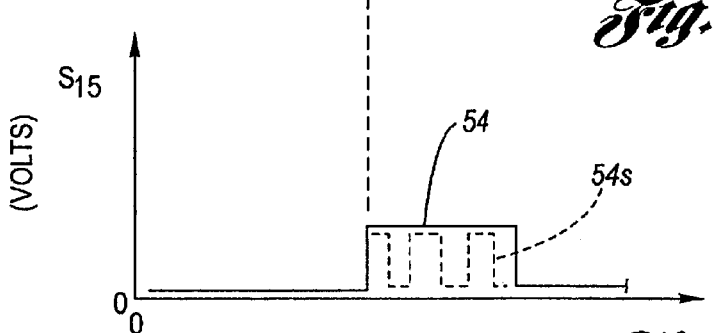

FIGS. 2A–2B are timing diagrams showing, in greater detail, the generation of an activation signal based on detection of a transient signal on the battery voltage line B+. FIG. 2A specifically shows a voltage range, between a first, upper level, designated $V_1$, and a second, lower level, designated $V_2$. The predetermined range defines a range in which an output voltage level of battery 38 is expected to fall if the battery 38 is in a normal, healthy condition, but when the generator 16 is not operating, plus an additional safety or guard band. For example, a standard battery operating voltage may lie, for the 12-volt battery 38 described above, between about 11.9 and 12.3 volts. On the upper end, the threshold $V_1$ may be about 12.6 volts, the level above which is indicative of the generator 16 generating power. On a lower end, the threshold $V_2$ may be defined to be about 11.6 volts, slightly less than the lower level referred to above indicative of a starter motor being added as a lead, for example.

By way of reference, when the engine 22, and generator 16 are being operated, and the generator 16 is being suitably regulated by voltage regulator 11, the output is maintained at a level above the range described above, such regulated voltage being designated $V_{REG}$ in FIG. 2A. This allows, during active running of the engine and generator, of an at least small trickle charging current to flow through the storage battery 38.

Thus, at some time $t_0$ when the engine 22 is not running (and thus the generator 16 is also not being operated), the voltage level of the battery 38, namely the voltage level at junction 40 (designated signal $S_{40}$), may lie within the above-described predetermined range $V_1$ to $V_2$. Voltage detection circuit 14 is configured to detect when a voltage level of signal $S_{40}$ assumes a level that is indicative of an engine being started or other starting condition, and generate an activation signal $S_{15}$ in response thereto. In a conventional vehicle, when the user turns on the ignition, and keys to the "start" position, electrical current is drawn from storage battery 38 in order to run a conventional starter motor (not shown). This results in a momentary drop in the battery voltage level, as a large amount of electrical current is drawn from the storage battery 38. This voltage transient is therefore indicative of an attempt to start engine 22. The lower threshold $V_2$ is selected, in one embodiment, so as to detect such an event. Thus, in FIG. 2A, at time $t_1$, a start attempt has been made, as indicated by a drop in the battery voltage $S_{40}$, below the lower threshold level $V_2$.

As shown in FIG. 2B, voltage detection circuit 14 is operative to detect the above-described transition of the battery voltage level $S_{40}$ below threshold level $V_2$ at time $t_1$, and generate the activation signal in an asserted state, as shown in exemplary fashion by a pulse 54.

Figure 3:
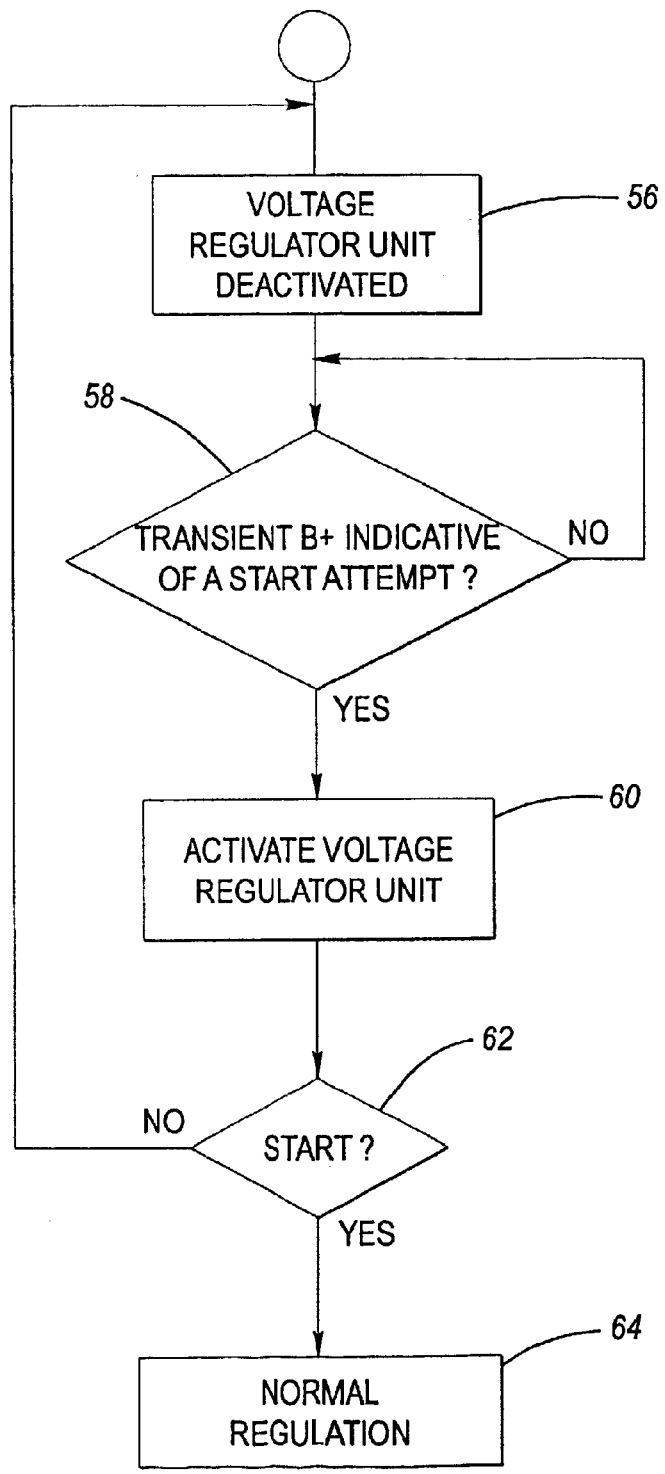
FIG. 3 is a flow chart showing the inventive method of activating a voltage regulator of the present invention.

FIG. 3 is a flowchart diagram illustrating the method according to the present invention. In step 56, the voltage regulator unit 12 of voltage regulator 11 is deactivated. This may have in-fact occurred when the vehicle was last turned off, when the engine 22 was stopped. The method then proceeds to step 58.

In step 58, the voltage detection circuit 14 determines whether there is a transient signal on the battery $S_{40}$ line indicative of a start attempt. As shown above, in connection with FIG. 2A and FIG. 2B, this may, in one embodiment, be simply a threshold detection (i.e., when the battery voltage level falls below a threshold level, $V_2$). However, other characteristics of the starting event (i.e., connecting the battery to the engine starter) may be observed and detected. For example, certain characteristic current draws, or the like, may also be looked for by circuit 14 in determining whether the starter has been connected as a load in an attempt to start engine 22. In further embodiments, other approaches for starting engine 22 may also be expected, and accordingly, circuit 14 may be suitably configured to detect these approaches. For example, the vehicle may be "jump started" wherein the battery from another vehicle is used (as shown), the vehicle may be push-started or the like. In any event, if no transient is detected ("NO"), in step 58, the method branches back and step 58 is again performed. This "loop" is continued until a desired transient signal is detected. Thus, if the answer is "YES," then the method branches to step 60.

In step 60, circuit 14 activates voltage regulator unit 12. In one embodiment, a pulse, such as pulse 54 in FIG. 2B, is generated and is applied to an activation input such as a "LAMP" input designated "L" in the figures. The "LAMP" input on voltage regulation unit 12 is so designated because in conventional systems, a lamp circuit may be provided that (i) illuminates a warning lamp when the charging system is not working properly when the ignition is on, and (ii) generates an activation signal when the ignition is keyed on that is provided to the "LAMP" input of a voltage regulation unit for activation. Of course, this prior art arrangement has shortcomings inasmuch as the battery would be subject to drain even when there is no desire to start the engine, such as when the vehicle operator is just listening to the radio or the like, and, additionally, there requires a separate connection from the lamp circuit to the lamp input on the voltage regulation unit, which, as noted above, is subject to failure, among other things. The description of a "LAMP" input, however, in voltage regulation unit 12 is exemplary only and not limiting in nature, only an activation input of some kind is required.

Once activated, the voltage regulation unit will perform a start procedure wherein the switch 44 is, in one embodiment, strobed in a predetermined manner in order to produce electrical current through field winding 20. In one embodiment, such predetermined manner involves strobing at a 30% duty cycle, which may last over a predetermined period of time (e.g., between about 3 to 5 seconds), and which preferably cycles at a predetermined frequency (e.g., selected from the range of between about 200 hz to about 400 hz). The combination of the predetermined period of time and frequency of the strobing may be selected to provide a desirable starting current in field winding 20. Thus, if engine 22 is actually turning, thereby turning the generator, then such field current may be expected to be sufficient to allow generation of electricity at the output of generator 16 (i.e., at the output of junction 30). However, if the engine/generator are not turning, then there will be no effect. While the ON time and OFF time of the duty cycle will vary depending on the type of transistor 44 being used, the desired starting current in field winding 20, and like considerations, an exemplary combination of ON and OFF times is an ON time of about 10 milliseconds and an OFF time of about 30 milliseconds.

With continued reference to FIG. 3, when the battery voltage exceeds the first, upper threshold $V_1$, then this condition is indicative of the engine and generator rotating to produce electricity. In decision block 62, this is considered to be a valid "start" condition, meaning that an operator is attempting to start engine 22. The method then branches to step 64, wherein normal regulation via voltage regulation unit 12 is commenced. However, if, after an initial start up procedure, as described above (e.g., 3–5 seconds) does not result in the battery voltage, $S_{40}$, surpassing the upper level $V_1$, then this means that no such "start" condition is being initiated. Control, accordingly, returns to step 56, wherein the voltage regulator unit 12 is deactivated (to minimize battery drain).

In an alternate embodiment, strobing circuitry 13 (best shown in FIG. 1) may be provided if strobing of the activation signal $S_{15}$ is desirable. Exemplary situations where strobing may be desirable include situations where voltage regulation unit 12 is not equipped with its own strobing circuitry and where the voltage regulation unit 12 and/or transistor 44 are of the type that require a strobed activation signal. Strobing circuitry 13 may be connected to the activation signal $S_{15}$ and arranged so that the activation signal $S_{15}$ is strobed before it is applied to the activation input ("L") of voltage regulation unit 12. This is shown in exemplary fashion, in dashed-line format, as activation signal 54s (strobed) in FIG. 2B.

Voltage regulation unit 12 may be configured to continue operation on its own after an activation signal has been applied for a limited duration, and regulation of the generator output has commenced. Accordingly, the output of detection circuit 14 or strobing circuitry 13 (when used) may be configured to have a limited duration consistent with the timing requirements of voltage regulation unit 12.

In other embodiments, further features are implemented to minimize or eliminate false starts, and/or minimize battery drain. For example, an unhealthy battery may always be below the lower threshold level $V_2$ (best shown in FIG. 2A). In addition, the operator of the vehicle may turn the headlamps on while the engine is off, thereby bringing down the battery voltage below the lower threshold $V_2$. In either case, it may be undesirable to turn "on" the voltage regulator. Therefore, in alternate embodiments, the present invention provides filtering mechanisms, and counting mechanisms to prevent the voltage regulator unit 12 from, in-effect, being "activated" all the time, or for the duration of the above-described false conditions, or other false conditions. Thus, circuit 14 may be further configured to keep a count of the number of "failed" attempts at commencing regulation (i.e., those attempts where the field current was strobed on, but that, due to the engine/generator not rotating, the battery voltage $S_{40}$ did not exceed the upper threshold $V_1$). After a predetermined number of failed "start" attempts (e.g., five in one embodiment), a predetermined delay may be invoked (e.g., 5 seconds). Selection of the count value allows for such number of successive iterations through the voltage strobing start-up procedure before the above-mentioned deferral time, thereby reducing the drain on battery 38, which is especially important if battery 38 has already been substantially discharged and therefore whose voltage is already low.

In addition, in a still further embodiment, circuit 14 is configured to filter spurious voltage transients, and reject the same as amounting to noise not indicative of an attempt to turn on a starter motor to start engine 22. For example, extremely short duration "spikes" may be filtered, to avoid recognizing a successful starting operation when such starting operation has really not been initiated at all by the operator.

Figure 4:
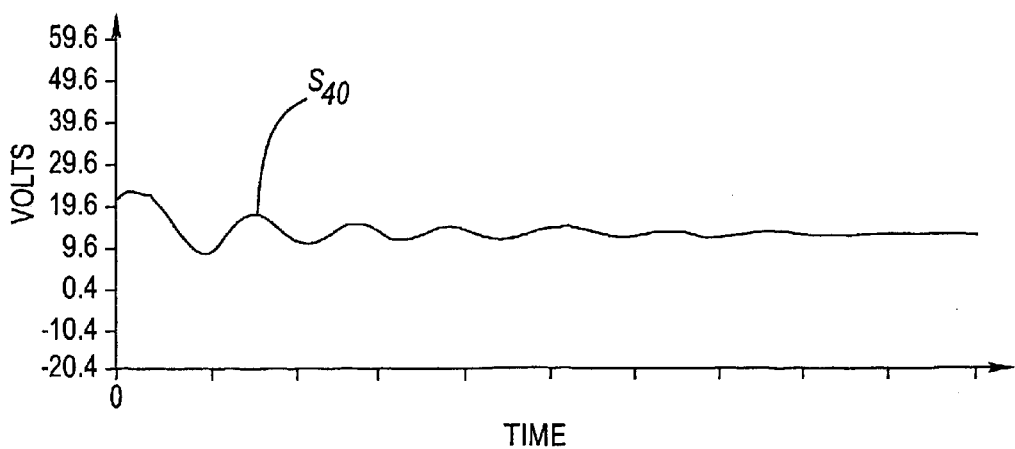
FIG. 4 is a timing diagram showing a battery voltage corresponding to a startup interval of an internal combustion engine (with starter).

FIG. 4 shows the level of a starter 66 output on junction 40 during the start up procedure indicated above. As shown in FIG. 4, current through the field winding 20, coupled with rotation of the generator rotor, will result in an output on DC output 30 of generator 16, which is coupled to junction 40, and shown as signal $S_{40}$ in FIG. 4. Initially, field current is passed through field winding 20, and the accompanying rotation results in a relatively large voltage, as shown in FIG. 4 (e.g., approximately 23.6 volts for one half of one cycle). Feedback of this increased voltage level to voltage regulation unit 12 will cause it, as is well known, to adjust the level of field current applied through field winding 20. As shown this process, after 5–6 cycles, results in maintaining a regulated voltage output, for example, approximately 13.6 volts in FIG. 4.

While the present invention has been described with reference to certain preferred embodiments and implementations, it is understood that various modifications and variations will no doubt occur to those skilled in the art to which this invention pertains. These and all other such variations which basically rely of the teachings through which this disclosure has advanced the art are properly considered within the scope of this invention.

The preferred embodiment was chosen and described on order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A method for battery-level activation of a voltage regulator comprising the steps of:
   measuring a level of battery voltage signal of a battery;
   generating an activation signal when said level is indicative of an attempt to start an engine; and
   applying said activation signal to an activation input of the voltage regulator to thereby activate said voltage regulator when said activation signal is applied.

2. The method of claim 1 further including the step of strobing a field current of a generator whose output is being regulated by said regulator when said activation signal is applied.

3. The method of claim 1 wherein said measuring step includes the substep of ignoring voltage spikes in said battery voltage signal.

4. The method of claim 1 further including the step of detecting a no load change condition.

5. A voltage regulation system comprising:
   a voltage regulation unit configured to control a field current of a generator; and
   a voltage detection circuit which activates said voltage regulation unit upon detecting a battery voltage signal below a predetermined voltage range.

6. The system of claim 5 wherein the generator has an output that is configured for connection to the battery.

7. The system of claim 6 wherein said voltage regulation unit is configured to control the field current as a function of the battery voltage signal so as to achieve a regulated level for the battery voltage signal.

8. The system of claim 5 further comprising a battery to provide said battery voltage signal to said voltage detection circuit.

9. The system of claim 5 further comprising a starter circuit.

10. A voltage regulator for regulating a voltage of a battery comprising:
    a voltage regulation unit configured to control a field current of a current generator, said generator having an output coupled to the battery, the voltage regulation unit having an activation input configured to receive an activation signal to activate the voltage regulation unit in response thereto;
    an activation apparatus configured to activate the voltage regulation unit by generating said activation signal in response to the battery voltage indicative of an attempt to start an engine.

11. The regulator of claim 10 wherein said activation apparatus is further configured to generate said activation signal when the battery voltage drops below a predetermined threshold level indicative of an attempt to start an engine.

12. The regulator of claim 10 wherein said activation apparatus is further configured to generate said activation signal when the battery voltage is indicative of a starter motor being activated.

* * * * *